United States Patent Office 3,232,920
Patented Feb. 1, 1966

3,232,920
PREPARATION OF RUBBERY POLYMERS
OF BUTADIENE
Floyd E. Naylor, Bartlesville, Okla., assignor to Phillips Petroleum Company, a corporation of Delaware
No Drawing. Filed Mar. 9, 1961, Ser. No. 94,427
17 Claims. (Cl. 260—94.3)

This invention relates to the polymerization of butadiene. In one aspect the invention relates to the production of rubbery polymers of butadiene having primarily 1,2-addition in the presence of a catalyst comprising molybdenum pentachloride and a compound selected from the group consisting of $R_nM$ and $M'M''H_4$, wherein R is selected from the group consisting of alkyl, aryl, cycloalkyl, aralkyl and alkaryl radicals containing 1–10 carbon atoms and the R's can be unlike, M is a metal selected from the group consisting of gallium, lead, zinc, mercury and indium, $n$ is equal to the valence of the metal M, M' is an alkali metal and M'' is selected from the group consisting of aluminum and boron.

This application is a continuation-in-part of my copending U.S. application Serial No. 719,486, filed on March 6, 1958, now abandoned.

Butadiene can be polymerized in the presence of a variety of catalysts to provide rubbery polymers which vary in their properties and have substantially different molecular configuration. For example, it is known that butadiene can be polymerized by 1,2-addition, cis-1,4-addition and trans-1,4-addition. The particular type of polymerization obtained appears to be a function primarily of the specific catalyst employed. For example, when butadiene is polymerized in the presence of a catalyst system comprising lithium aluminum hydride and titanium tetraiodide, rubbery polymers are obtained which have not more than 10 percent 1,2-addition and principally trans-1,4-addition. The preparation of these polymers is described in detail in the copending application of R. P. Zelinski et al., Serial No. 579,429, filed April 20, 1956 now U.S. Patent No. 3,050,513. Also, when butadiene is polymerized in the presence of a catalyst composition comprising triethylaluminum and titanium tetraiodide, rubbery polymers are obtained which have 90 percent or higher cis-1,4-addition. This reaction is described in the copending application of D. R. Smith et al., Serial No. 578,166, filed April 16, 1956.

It is an object of this invention to provide an improved process for the preparation of rubbery polymers of butadiene.

Another object of the invention is to provide a process for the preparation of rubbery polymers of butadiene having primarily 1,2-addition.

A further object of the invention is to provide rubbery polymers of butadiene which contain a high percentage, e.g., 90 percent and higher 1,2-addition.

Still another object of the invention is to provide rubbery vinyl polymers of butadiene which are crystalline at room temperature.

These and other objects of the invention will become more readily apparent from the following detailed description and discussion.

The foregoing objects are achieved broadly by polymerizing butadiene in the presence of a catalyst comprising molybdenum pentachloride and a compound selected from the group consisting of $R_nM$ and $M'M''H_4$, wherein R is selected from the group consisting of alkyl, aryl, cycloalkyl, aralkyl and alkaryl radicals containing 1–10 carbon atoms and the R's can be unlike, M is a metal selected from the group consisting of gallium, lead, zinc, mercury and indium, $n$ is equal to the valence of the metal M, M' is an alkali metal and M'' is selected from the group consisting of aluminum and boron. It is thus possible to recover a rubbery polymer product having at least 80 percent, e.g., 90 to 95 percent and higher, 1,2-addition. It is also possible by the practice of the present process to obtain a rubbery polybutadiene which contains in the range of 65 to 80 percent 1,2-addition and which is crystalline at room temperature.

In one aspect of the invention when the molybdenum pentachloride is used in conjunction with a complex metal hydride ($M'M''H_4$), the complex metal hydride is introduced to the reaction system dissolved in a solvent, such as an ether.

In carrying out the process of this invention, butadiene is subjected to polymerization in the presence of a catalyst comprising molybdenum pentachloride and a complex metal hydride ($M'M''H_4$) in solution in a solvent or a metal alkyl ($R_nM$) as described above. The products obtained by the present process can be broadly described as being vinyl polymers of 1,3-butadiene, e.g., polybutadienes containing at least 65 percent 1,2-addition. However, the particular product obtained depends upon the specific catalyst system employed in the process. It is thus possible by selection of the catalyst system to prepare vinyl polybutadienes which have a number of outstanding physical properties. For example, a polybutadiene prepared with an organozinc-molybdenum pentachloride catalyst and containing from 90 to 95 percent and higher 1,2-addition has been found to have a very low heat build-up, good blowout resistance and excellent resistance to aging. A particularly outstanding product is obtained by polymerizing butadiene with a catalyst comprising an organometal compound of gallium and molybdenum pentachloride. The polybutadiene so produced generally contains from 65 to 80 percent 1,2-addition and is further identified by the fact that it is crystalline at room temperature. The X-ray diffraction pattern of this high vinyl, crystalline polymer indicates by the spacing of the rings that it is a syndiotactic polybutadiene. In other words, the polybutadiene molecule is formed primarily by 1,2-addition (65 to 80 percent) with the butadiene units linked head-to-tail and with the asymmetric carbon atoms in the chain alternating in regular fashion between the "d" and "l" forms. It was completely unexpected when it was found that an organogallium-molybdenum pentachloride catalyst produced a crystalline polymer since the products obtained with other catalysts of this invention are amorphous. Furthermore, while vinyl polymers of butadiene can be produced with a catalyst consisting of an organo compound of an alkali metal, these products are also amorphous rather than crystalline. The crystalline polybutadiene is also characterized by many outstanding physical properties, particularly as regards tensile strength, shore hardness, modulus, and aging characteristics.

The process of this invention can be conducted at temperatures varying over a rather wide range. While it is not intended to limit the invention to any particular operating conditions, the process is usually carried out at a temperature in the range of about zero to about 150° C., and more desirably at a temperature between 10 and 80° C. The polymerization can be carried out under autogenous pressure or any pressure suitable for maintaining the reaction mixture substantially in the liquid phase. The pressure will thus depend upon the particular diluent being utilized and the temperature at which the polymerization is conducted. However, higher pressures can be employed if desired, these pressures being obtained by some such suitable method as the pressurization of the reactor with a gas which is inert with respect to the polymerization reaction. The polymerization can be carried out either as a batch operation or as a continuous process. It is within the scope of the invention to introduce the diluent (if used), catalyst components and butadiene to the reaction zone in any order or in any combination. It is to be understood that it is not intended to limit the invention to any specific charging procedure.

The polymerization process of this invention is usually carried out in the presence of a diluent. Diluents suitable for use in the process include aromatics, such as benzene, toluene, xylene, ethylbenzene, and mixtures thereof. It is also within the scope of the invention to use other hydrocarbons as diluents, e.g., cycloaliphatic hydrocarbons such as cyclohexane, cyclopentane, methylcyclohexane and the like. When employing a cycloaliphatic hydrocarbon as the diluent, it is generally preferred to use a promoter in order to ensure the production of a gel-free, rubbery product. The promoters used are preferably selected from the group consisting of dialkyl ethers; cyclic ethers; ethers of ethylene glycol; tertiary amines, which can contain not more than one aryl group; N,N-dialkyl-substituted amides; and alkylideneamines. These latter compounds are often referred to as Schiff bases, i.e., the reaction product formed by the reaction of a primary amine with an aldehyde or ketone. Examples of compounds suitable for use as promoters include dimethyl ether, diethyl ether, diisopropyl ether, di-n-propyl ether, di-n-butyl ether, di-n-octyl ether, didecyl ether, methyl ethyl ether, ethyl n-propyl ether, tert-butyl n-dodecyl ether, n-hexyl n-decyl ether, di-tert-heptyl ether, tetramethylene oxide (tetrahydrofuran), 1,3-dioxane, 1,4-dioxane, 1,2-dimethoxyethane, 1,2-diethoxyethane, 1,2-di-n-propoxyethane, 1-methoxy-2-ethoxyethane, 1-methoxy-2-n-pentoxyethane, 1-ethoxy-2-n-hexoxyethane, 1,2-di-n-nonoxyethane, trimethylamine, triethylamine, tri-n-propylamine, tri-n-butylamine, tri-tert-butylamine, tri-n-hexylamine, methyldiethylamine, dimethylhexylamine, n-butyl-di-n-octylamine, di-tert-butyl-n-dodecylamine, methylethyl-n-propylamine, N,N-dimethylaniline, N-methyl-N-ethylaniline, N,N-diisopropylaniline, N,N-di-n-butylaniline, N-ethyl-N-dodecylaniline, N,N-di-n-butyl-4-toluidine, N-methylmorpholine, N-octylmorpholine, N-tert-hexylmorpholine, N-dodecylmorpholine, pyridine, 2,4,6-trimethylpyridine, 3,5-di-n-hexylpyridine, 4-tert-butylpyridine, N-methylpiperidine, N-isopropylpiperidine, N-dodecylpiperidine, N,N-dimethylformamide, N,N-diethylacetamide, N-methyl-N-n-butylpropionamide, N,N-di-n-hexylcaprylamide, N,N-di-n-octylformamide, N-benzylideneaniline, N-propylideneaniline, N-butylideneaniline, N-(1-ethylbutylidene)-4-toluidine, N-(1-n-butyloctylidene)aniline, N-butylidene-n-butylamine, N-ethylidenethylamine, N-benzylidenethylamine, and N-benzylidenedodecylamine.

The amount of the promoter used when employing a cycloaliphatic hydrocarbon as the diluent can vary within rather wide limits. In general, it is only necessary to use a relatively small amount of the promoter. The amount of promoter is usually in the range of 0.1 to 30 mols per mol of molybdenum pentachloride. However, the preferred ratio is from 0.5 to 10 mols of promoter per mol of molybdenum pentachloride, and very frequently less than 4 or 5 mols of the promoter per mol of molybdenum pentachloride is employed.

When practicing the process of this invention with a catalyst comprising molybdenum pentachloride and a complex metal hydride, the complex metal hydride is charged to the reactor as a solution. Suitable solvents which can be employed for this purpose include ethers and amines. Examples of suitable ethers are the alkyl ethers, preferably those compounds having alkyl groups containing 1 to 4 carbon atoms, such as dimethyl ether, diethyl ether, dipropyl ether, dibutyl ether, methyl ethyl ether, ethyl butyl ether, and the like; and saturated cyclic ethers having 5 and 6 membered carbon-oxygen rings containing not more than 2 oxygen atoms and a total of not more than 8 carbon atoms, such as dioxane, tetrahydrofuran, and the like. Examples of suitable amines include tertiary amines such as triethylamine, tri-n-propylamine, tri-n-butylamine, dimethylhexylamine, and N-methyl-morpholine. Examples of other suitable ethers and amines which can be used are mentioned hereinabove with relation to the discussion of promoters employed with cycloaliphatic diluents. It is to be understood that when a solution of a complex metal hydride is used as a catalyst component it is then unnecessary to employ the promoter with a cycloaliphatic diluent. While the function of the ether or amine is not clearly understood, it is believed that a complex may be formed with the catalyst component. For example, when diethyl ether is used as a solvent, it appears that the dietherate of the hydride is formed. It is desirable to provide sufficient solvent to form the complex, which would normally be a maximum of 2 mols of solvent per mol of hydride. Usually the ether solution, which is preferred, contains an excess of ether, for example, solutions are employed containing from 90% to over 99% ether by weight.

Some examples of compounds of the formula $R_nM$ which can be employed in the catalyst system of the present invention are: trimethylgallium, diethylphenylgallium, tri-n-butylgallium, triethylgallium, triisooctylgallium, tri-n-decylgallium, triphenylgallium, tribenzylgallium, tri-p-tolylgallium, tetraethyllead, tetraphenyllead, tetracyclohexyllead, triethylphenyllead, tetra(4-phenylbutyl)lead, diethylzinc, methylpropylzinc, di-n-hexylzinc, di(4-butyl-cyclohexyl)zinc, di-n-butylmercury, di-n-decylmercury, dicyclohexylmercury, methylethylmercury, tributylindium, tribenzylindium, tri(2,4-diethylphenyl)indium and methylethylpropylindium. Some examples of compounds of the formula $M'M''H_4$ which can be used are lithium aluminum hydride, lithium borohydride, potassium aluminum hydride, cesium borohydride, rubidium aluminum hydride, sodium borohydride, and sodium aluminum hydride.

The amount of complex metal hydride or metal alkyl present in the catalyst composition can vary over a rather wide range. It is usually preferred to use between about 0.8 and 5.0 mols per mol of molybdenum pentachloride. However, more desirably mol ratios in the range of about 1.0 and 2.0 are employed. The amount of combined catalyst components employed in the process is usually in the range of between about 0.10 weight percent and about 10 weight percent, and preferably between about 0.25 and about 6.0 weight percent, based on the amount of butadiene introduced to the polymerization reaction.

Upon completion of the polymerization reaction the reaction mixture can be treated to inactivate the catalyst and purify the polymer product. The preferred method for inactivating the catalyst is to add to the reaction product an alcohol, such as methyl alcohol, ethyl alcohol, isopropyl alcohol, etc. In addition to neutralizing the catalyst the alcohol causes the polymer to precipitate, after which the polymer product can be separated from the alcohol and diluent by suitable means, such as decantation or filtration. If desired, the polymer can be redissolved in a suitable solvent and reprecipitated by again adding an alcohol. It is also within the scope of the invention to add a conventional antioxidant such as phenyl-beta-naphthylamine to the polymer solution prior to precipitating the polymer.

The polybutadiene produced in accordance with the process of this invention is a rubbery polymer having at least 65 percent and up to 95 percent and higher 1,2-addition. As used herein, the term "rubbery polymer" includes elastomeric, vulcanizable polymeric material which after vulcanization possesses the properties normally associated with vulcanized rubber. Accordingly the rubbery polymer produced can be compounded and vulcanized in a manner similar to that which is employed for commercially available synthetic or natural rubbers. In carrying out these operations, conventional vulcanization accelerators, reinforcing agents, fillers and other compounded ingredients such as are commonly employed in the art in compounding rubbers can be utilized in conjunction with the polymers prepared in accordance with this invention.

The following examples are presented in illustration of the invention in its preferred embodiment.

EXAMPLE I

A number of runs were carried out in which 1,3-butadiene was polymerized to rubbery polymer by means of a catalyst system consisting of lithium aluminum hydride and molybdenum pentachloride. The molybdenum pentachloride used in these runs was commercial grade (Climax Molybdenum Company), and was ball milled and passed through an 80 mesh screen before use. The 1,3-butadiene used in these runs was Phillips special purity grade, and was stored at about −20° C. over Drierite prior to use. The diluent employed in these runs was toluene of reagent grade. This reagent grade toluene was further purified by fractionally distilling the material and discarding the first 20% of the overhead. The lithium aluminum hydride employed in these runs was obtained as a 0.5 molar ether solution by extracting solid lithium aluminum hydride with diethyl ether in a Soxhlet extractor.

These polymerization runs were carried out according to the following procedure. The above-described toluene was charged to a seven-ounce beverage bottle, followed by a three-minute purge with prepurified nitrogen. After allowing to stand overnight, the lithium aluminum hydride, dissolved in diethyl ether, was then added to the bottle, after which the mixture was purged for one minute with prepurified nitrogen which was introduced at a rate of 3 liters per minute. This nitrogen purge served to remove a large amount of the ether present. Solid molybdenum pentachloride was then weighed into the bottle according to the amount desired. The bottle was then sealed with a self-sealing gasket which had been previously extracted with acetone, and the bottle was capped with a crown bottle cap which was punched so as to expose a portion of the self-sealing gasket. The 1,3-butadiene was then charged to the bottle by inserting a syringe through the gasket.

The bottles were charged according to the following polymerization recipe:

Recipe

Ingredients:
  Butadiene, parts _____ 100
  Toluene, parts _____ 440
  MoCl$_5$, parts _____ Variable
  LiAlH$_4$, millimols _____ 10
  LiAlH$_4$/MoCl$_5$, mol ratio _____ Variable
  Temperature, ° C. _____ 50
  Time, hours _____ 22

After charging each bottle according to the above recipe, the bottle was placed in a constant temperature bath and tumbled in this bath for 22 hours at 50 °C. At the end of this time, the bottle was removed, and sufficient phenyl-beta-naphthylamine was charged to the bottle to provide approximately 2 percent by weight of this antioxidant based on the polymer. The contents of the bottle were then dumped into approximately 1 liter of isopropyl alcohol, and resulting mixture was then stirred vigorously. The polymer which was present precipitated, and the rubbery polymer was removed and dried in a vacuum oven. The yield of polymer and the percent conversion were then calculated.

The results of several of these runs are given below as Table I.

TABLE I

| Run Number [1] | LiAlH$_4$/ MoCl$_5$, Mol Ratio | LiAlH$_4$, Millimols | MoCl$_5$, Millimols | Conversion, Percent | Inherent Viscosity |
|---|---|---|---|---|---|
| 1 | 1.17 | 10.0 | 8.53 | 30 | 4.52 |
| 2 | 1.21 | 10.0 | 8.26 | 40 | 6.30 |
| 3 | 1.30 | 10.0 | 7.68 | 35 | 5.61 |
| 4 | 1.40 | 10.0 | 7.12 | 40 | 5.98 |
| 5 | 1.50 | 10.0 | 6.68 | Trace | |

[1] In Run 5, the LiAlH$_4$ was added without additional purging, but in the other runs, the toluene was purged an additional one minute before adding the LiAlH$_4$ solution.

The polybutadiene products of runs 2 and 4 were examined by infrared analysis to determine the percentage of the polymers formed by 1,2-addition of the butadiene. The method of Silas, Yates and Thornton, Anal. Chem. 31, No. 4, 529–532 (1959) was used in making these determinations, and the following results were obtained:

*Microstructure, percent*

| Run No. | Cis | Trans | Vinyl |
|---|---|---|---|
| 2 | 7.9 | 4.2 | 87.9 |
| 4 | 16.5 | 3.6 | 79.9 |

EXAMPLE II

A series of runs was carried out in the same manner as in Example I. These runs were carried out according to the following recipe:

Recipe

Ingredients:
  Butadiene, parts by weight _____ 100
  Toluene, parts by weight _____ 400
  Lithium aluminum hydride * (LAH), parts
    by weight _____ Variable
  Molybdenum pentachloride (MPC), parts
    by weight _____ Variable
  Temperature, ° C. _____ †50
  Time, hours _____ 17

*In these runs, the lithium aluminum hydride was charged as an ether solution, and after charging the excess ether was removed by purging with prepurified nitrogen.
†122° F.

The results of these runs are listed below as Table II.

TABLE II

| Run No. | LAH/ MPC Mol Ratio | Lithium Aluminum Hydride | | Molybdenum Pentachloride | | Con., Per- cent | Inherent Visc. | Microstructure [b] Percent | | |
|---|---|---|---|---|---|---|---|---|---|---|
| | | Mmols | P.h.m. | Mmols | P.h.m. | | | Cis | Trans | Vinyl |
| 6 | | 10 | 0.38 | | | 0 | | | | |
| 7 | 1.67 | 4 | 0.15 | 2.4 | 0.65 | 10 | 7.58 | | | |
| 8 | 2.0 | 10 | 0.38 | 5 | 1.36 | 40 | [a] 7.07 | 6.9 | 3.3 | 89.8 |
| 9 | 2.8 | 6 | 0.23 | 2.1 | 0.57 | 5 | | | | |

[a] This polymer was gel free.
[b] Determined by the above-mentioned method of Silas, Yates and Thornton.

EXAMPLE III

Several additional runs were made in the same manner as those for Example I using the same recipe, except that cyclohexane was employed instead of toluene, and the reactions ran for 88 hours.

TABLE III

| Run No. | LiAlH$_4$/MoCl$_5$ Mol Ratio | LiAlH$_4$ Millimols | MoCl$_5$ Millimols | Conversion, Percent |
|---|---|---|---|---|
| 10 | 1.85 | 12 | 6.5 | 35 |
| 11 | 1.95 | 13 | 6.7 | 30 |
| 12 | 2.00 | 11 | 5.5 | 20 |
| 13 | 2.00 | 10 | 5.0 | 10 |

The above polymers were composited and an infrared analysis of the composite was made according to the aforementioned method of Silas, Yates and Thornton. The unsaturation values for the composite were 5.6 percent cis, 10.7 percent trans and 83.7 percent vinyl (1,2) respectively.

EXAMPLE IV

A number of polymerization runs were carried out according to the procedure described in Example I. These runs were carried out according to the following polymerization recipe:

*Recipe*

| | Parts by weight except as noted | | | |
|---|---|---|---|---|
| | A | B | C | D |
| Butadiene | 100 | 100 | 100 | 100 |
| Toluene | 440 | 440 | 440 | 440 |
| Reducing Agent, mols | 10 | 7 | 1.5 | 10 |
| MoCl$_5$ | Variable | Variable | Variable | Variable |
| Temp., °C | 50 | 50 | 50 | 50 |
| Time, Hours | 5 | 5 | 5 | 67 |

The results of several runs which were made according to the above polymerization recipe are expressed below in Table IV.

EXAMPLE V

Several runs were made in which 1,3-butadiene was polymerized to a polymeric material employing a catalyst system of triisobutylaluminum and molybdenum pentachloride. These runs were carried out according to the following recipe:

*Polymerization recipe*

Ingredients:
  Butadiene _____parts by weight__ 100
  Toluene _____do____ 440
  Triisobutylaluminum (TBA) _____do____ Variable
  MoCl$_5$ _____do____ Variable
  TBA/MoCl$_5$ _____do____ Variable
  Temperature _____°C__ 50
  Time _____hours__ 24

The toluene in these runs was treated, prior to charging to the bottles, in the same manner as was employed in Example I. The triisobutylaluminum was charged as a solution in toluene by means of a syringe. The butadiene was added last in these runs. The results of these runs are given below as Table V.

TABLE V

| Run No. | TBA/MoCl$_5$ Mol Ratio | TBA, Millimols | MoCl$_5$, Millimols | Conversion |
|---|---|---|---|---|
| 14 | 1.0 | 10 | 10.0 | 10 |
| 15 | 1.5 | 10 | 6.7 | 5 |
| 16 | 1.8 | 10 | 5.6 | ([1]) |
| 17 | 3.0 | 15 | 5.0 | ([1]) |
| 18 | | 0 | 4.0 | 10 |

[1] Trace.

The above polymers are utilized as control runs in this invention. The polymer from the above runs was resinous rather than rubbery, and the polymer from the runs employing triisobutylaluminum and molybdenum pentachloride strongly resembled the polymer from the run in which molybdenum pentachloride alone was employed.

TABLE IV

| Run No. | Recipe | MoCl$_5$, Millimols | Reducing Agents | Reducing Agent/ MoCl$_5$, Mol Ratio | Conv., Percent | Microstructure, Percent [1] | | |
|---|---|---|---|---|---|---|---|---|
| | | | | | | Cis | Trans | Vinyl |
| 16 | A | 8.33 | Triethylgallium | 1.2 | ([2]) | 0–2 | 21 | 77–79 |
| 17 | A | 2.0 | Lithium borohydride | 5.0 | 84 | 4±2 | 4 | 92 |
| 18 | B | 5.83 | Tetraethyllead | 1.2 | 50 | 13±5 | 2±1 | 85±5 |
| 19 | C | 1.25 | Dibutylzinc | 1.2 | ([2]) | 3±2 | 3±1 | 94±3 |
| 20 | D | 8.3 | Di-n-butylmercury | 1.2 | 95 | ([3]) | | |
| 21 | D | 5.0 | Tributylindium | 2.0 | 99 | ([3]) | | |

[1] The following procedure was followed in determining the microstructure of the products obtained in runs 16 to 19. Infrared analyses were first made on three antioxidant-free samples (designated as reference or calibration polymers) which were high in cis, trans, and vinyl content, using a commercial infrared spectrophotometer. The polymers were dissolved in carbon disulfide to give 2.5 weight per cent solutions. The maximum absorbance band used for trans 1,4-unsaturation was 10.3 microns, and that used for vinyl was 11.0 microns. An empirical function of the area of the absorption band between 12.0 and 15.75 microns was used to measure cis 1,4-addition. After the absorbance due to each component was determined, the absorptivity for each component was calculated, and from these values the amount of each type of addition was calculated. The cis, trans and vinyl contents of the polymers of runs 16 to 19 were determined in the same manner and the amount of each type was calculated using the absorptivities found for the reference polymers.
[2] This run is one of a complete series. Conversion in all of the runs of the series was between 15 and 50%.
[3] Qualitative infrared analysis indicated very high vinyl content, comparable to polymers which were quantitatively analyzed.

EXAMPLE VI

A run was carried out with the catalyst butyllithium and molybdenum pentachloride following the same procedure and under the same conditions employed in Example I. No polymer was formed in this run.

It is to be noted from Examples I to V that the catalyst comprising molybdenum pentachloride and a complex metal hydride or a metal alkyl of gallium, lead, zinc, mercury or indium provide rubbery polymers having a high percentage of 1,2-addition. This is to be compared with the control runs of Example V wherein the catalyst system triisobutylaluminum molybdenum pentachloride was used and the polymer product obtained was resinous rather than rubbery in nature.

The specificity shown by the catalysts utilized in the method of this invention is further illustrated by Example VI wherein the mixture butyllithium and molybdenum pentachloride failed to produce polymerization.

EXAMPLES VII

A series of runs was conducted in which 1,3-butadiene was polymerized in the presence of catalyst systems consisting of (1) triethylgallium and molybdenum pentachloride, (2) di-n-butylzinc and molybdenum pentachloride and (3) diethylzinc and molybdenum pentachloride. Control runs were also carried out in which a n-butyllithium-containing catalyst was utilized. The procedure used in these runs was essentially the same as that employed in the conduct of the runs of Example I. The polymerization recipes used as well as the operating conditions and certain properties of the polymer products are shown hereinafter in Table VI. It will be noted that in certain cases the products from two or more runs were blended and the properties of the blend determined.

TABLE VI

| Run No. | 1 | 2-A | 2-B | 2-C | 3-A | 3-B | 4-A | 4-B | 5-A | 5-B | 6-A | 6-B |
|---|---|---|---|---|---|---|---|---|---|---|---|---|
| POLYMERIZATION RECIPES | | | | | | | | | | | | |
| 1,3-butadiene, parts by weight | 100 | 100 | 100 | 100 | 100 | 100 | 100 | 100 | 100 | 100 | 100 | 100 |
| Toluene, parts by weight | 880 | 1,500 | 600 | 600 | | | | | | | | |
| Cyclohexane, parts by weight | | | | | 390 | 390 | 390 | 390 | 390 | 390 | | |
| Benzene, parts by weight | | | | | | | | | | | 440 | 440 |
| Triethylgallium, millimols | 6 | | | | | | | | | | | |
| Di-n-butylzinc, millimols | | 4.2 | | | | | | | | | | |
| Diethylzinc, millimols | | | 3.8 | 4.6 | | | | | | | | |
| Molybdenum pentachloride, millimols | 5 | 3.5 | 3.2 | 3.8 | | | | | | | | |
| n-Butyllithium, millimols | | | | | 1.63 | 1.43 | 1.52 | 1.71 | 1.63 | 1.43 | 2.5 | 2.5 |
| Dimethoxyethane, parts by weight | | | | | 0.5 | 0.5 | | | | | | |
| Tetrahydrofuran, parts by weight | | | | | | | 1.0 | 1.0 | 0.5 | 0.5 | | |
| Temperature, °F | 122 | 122 | 122 | 122 | 41 | 41 | 86 | 86 | 122 | 122 | 122 | 122 |
| Time, hours | 24 | 21 | 4 | 4 | 18 | 18 | 16 | 16 | 12 | 12 | 3 | 18 |
| Conversion, percent | 72 | 45 | 50 | 83 | 100 | 100 | 100 | 100 | 100 | 100 | 100 | 100 |
| Mooney (ML-4 at 212° F.)[1] | (6) | 65 | | | 36.5 | | 33 | | 34.5 | | 35.4 | |
| Inherent viscosity | 2.3 | 7.5 | | | 1.78 | | 1.88 | | 1.95 | | 2.13 | |
| Gel, percent | 0 | 0 | | | 0 | | 0 | | 0 | | 0 | |
| Microstructure, percent: | | | | | | | | | | | | |
| Cis, by difference | 24.8 | 3 3 | | | 4 5.1 | | 4 12.8 | | 4 25.4 | | 5 38.7 | |
| Trans | 26.2 | 3 | | | 9.4 | | 30.1 | | 43.0 | | 50.6 | |
| Vinyl | 69 | 94 | | | 85.5 | | 57.1 | | 31.6 | | 10.7 | |

[1] ASTM-D927-55T.
[2] In determining the percentage of the polymer formed by cis 1,4-addition, the following procedure was followed. The polymers were dissolved in carbon disulfide containing 0.01 gram of phenyl-beta-naphthylamine per liter of carbon disulfide to form a solution containing 2.5 weight percent of the polymer. If the polymer as prepared contained antioxidant, t was removed by reprecipitating the polymer twice from cyclohexane prior to preparing the carbon disulfide solution. The infrared spectrum of each of the solutions (percent transmission) was then determined in a commercial infrared spectrometer. The percent of the total unsaturation present as trans 1,4- was calculated according to the following equation and consistent units: $\epsilon = E/tc$ where: $\epsilon$ = extinction coefficient (liters-mols$^{-1}$-microns$^{-1}$); $E$ = extinction (log $I°/I$); $t$ = path length (microns); and $c$ = concentration (mols double bond/liter). The extinction was determined at the 10.35 micron band and the extinction coefficient used was $1.26 \times 10^{-2}$ (liters-mols$^{-1}$-microns$^{-1}$). The percent of the total unsaturation present as 1,2- (or vinyl) was calculated according to the above equation, using the 11.0 micron band and an extinction coefficient of $1.73 \times 10^{-2}$ (liters-mols$^{-1}$-microns$^{-1}$). The percent of the total unsaturation present as cis 1,4- was obtained by subtracting the trans 1,4- and 1,2- (vinyl) determined according to the above methods from the theoretical unsaturation assuming one double bond per each $C^4$ unit in the polymer.
[3] Approximate values; polymer compared with a polymer of known configuration prepared in a similar system.
[4] Determined by method of Silas, Yates and Thornton.
[5] In determining the microstructure of this blend by infrared analysis, it was assumed that every polybutadiene sample is a three-component mixture of structurally pure polymers, each of mass 54, and either containing one double bond of the vinyl type (1,2-addition) with its major absorption at 11.0 microns, or one trans internal double bond (trans-1,4-addition) with its major absorption band at 10.4 microns, or one cis internal double bond (cis-1,4-addition) with its major absorption in the 12.5- to 15-5- micron region. Measurements at each of the three wave lengths, when fitted into the conventional calibration matrix, would yield the concentration of the three configurations in percentage of the total butadiene units present. Accordingly, three absorbance measurements were made. Two of these were obtained from band maxima (10.4 and 11.0 microns) and the third, at 12.5 and 15.5 microns, was an integrated absorbance obtained by measuring band area between these limits.
[6] Too high to measure.

In Runs 1, 2–A, 2–B and 2–C, the toluene was charged initially followed by the molybdenum pentachloride. The organometal was then introduced as a toluene solution after which the butadiene was added. All of the ingredients were charge at room temperature.

The procedure used in Runs 3–A and 3–B was to charge the cyclohexane initially after which the butadiene was added. Thereafter, the dimethoxyethane was added as a cyclohexane solution. The reactor was then cooled to 41° F. after which the butyllithium was added.

In Runs 4–A and 4–B, the cyclohexane was charged initially followed by the butadiene, tetrahydrofuran, and butyllithium in that order. All of the ingredients were charged at room temperature.

The procedure followed in Runs 5–A and 5–B was to charge the cyclohexane initially after which the butadiene and tetrahydrofuran were introduced in that order. The reactor was then heated to 122° F. after which the butyllithium was added.

In Runs 6–A and 6–B, the benzene was charged first followed by the butadiene. The butyllithium was then added to the reactor. All of the ingredients were charged to the reactor at room temperature.

The polymer product from Run 1 and the blends of polymers obtained from the other runs were compounded in accordance with the recipe shown hereinafter in Table VII. The compounded polymers were cured for 45 minutes at 307° F., and certain physical properties were then determined. The results of these determinations are also shown in Table VII.

of phenyl-beta-naphthylamine was added to the polymer solution before the polymer was coagulated by pouring

TABLE VII

| Run No. | 1 | | 2-A, B & C | | 3-A & B | | 4-A & B | | 5-A & B | | 6-A & B | |
|---|---|---|---|---|---|---|---|---|---|---|---|---|
| | Gum | Tread | Gum | Tread | Gum | Tread | Gum | Tread | Gum | Tread | Gum | Tread |
| Compounding Recipes, parts by weight: | | | | | | | | | | | | |
| Polymer | 100 | 100 | 100 | 100 | 100 | 100 | 100 | 100 | 100 | 100 | 100 | 100 |
| Philblack O [1] | ------ | 50 | ------ | 50 | ------ | 50 | ------ | 50 | ------ | 50 | ------ | 50 |
| Zinc Oxide | 3 | 3 | 3 | 3 | 3 | 3 | 3 | 3 | 3 | 3 | 3 | 3 |
| Stearic Acid | 2 | 2 | 2 | 2 | 2 | 2 | 2 | 2 | 2 | 2 | 2 | 2 |
| Flexamine [2] | 1 | 1 | 1 | 1 | 1 | 1 | 1 | 1 | 1 | 1 | 1 | 1 |
| Resin 731 [3] | 3 | 3 | 3 | 3 | 3 | 3 | 3 | 3 | 3 | 3 | 3 | 3 |
| Philrich [4] | ------ | ------ | ------ | ------ | ------ | ------ | ------ | ------ | ------ | ------ | ------ | ------ |
| Sulfur | 1.7 | 1.7 | 1.9 | 1.9 | 1.75 | 1.55 | 1.2 | 1.45 | 0.9 | 1.15 | 1.0 | 1.25 |
| Santocure [5] | 1.0 | 1.0 | 1.0 | 1.0 | 1.0 | 1.0 | 1.0 | 1.0 | 1.0 | 1.0 | 1.0 | 1.0 |
| Evaluation Data: | | | | | | | | | | | | |
| Cured 45 Minutes at 307° F.: | | | | | | | | | | | | |
| 300% Modulus, p.s.i.[6] | 690 | 2,750 | 220 | 2,210 | 190 | 1,960 | 190 | 1,620 | 190 | 1,200 | 180 | 1,210 |
| Tensile Strength, p.s.i.[6] | 1,160 | 3,760 | 390 | 2,680 | 320 | 2,600 | 210 | 2,990 | 210 | 2,930 | 180 | 2,740 |
| Elongation, percent [6] | 470 | 420 | 470 | 340 | 520 | 380 | 320 | 490 | 350 | 590 | 300 | 550 |
| Shore A hardness [7] | 51 | 69 | 32 | 65 | 32 | 66 | 35 | 66 | 37 | 63 | 45 | 71 |
| Resilience, percent [8] | | 69 | 79.6 | 56 | 83.2 | 62.4 | 85.5 | 67.3 | 83.3 | .69.6 | 80.2 | 69.7 |
| Heat build-up, Δ T, ° F.[9] | 44.2 | 55.4 | 16.2 | 36.8 | 22.9 | 59.1 | 21.6 | 62.5 | 29 | 66.2 | 32.1 | 67.9 |
| ν×10⁴, mols/cc.[10] | 1.08 | 1.98 | 1.00 | 1.89 | 1.08 | 2.15 | 1.18 | 2.09 | 1.12 | 1.83 | 1.09 | 1.87 |
| Oven Aged 24 Hours at 212° F.: | | | | | | | | | | | | |
| 300% Modulus, p.s.i.[6] | -------- | 3,400 | -------- | 2,500 | -------- | 2,550 | -------- | 2,310 | -------- | 1,890 | -------- | 1,900 |
| Tensile Strength, p.s.i.[6] | -------- | 3,600 | -------- | 2,570 | -------- | 2,630 | -------- | 2,720 | -------- | 2,870 | -------- | 2,230 |
| Elongation, percent [6] | -------- | 320 | -------- | 290 | -------- | 310 | -------- | 350 | -------- | 430 | -------- | 330 |
| Resilience, percent [8] | -------- | 69 | -------- | 53.4 | -------- | 65.1 | -------- | 71.3 | -------- | 72.2 | -------- | 74.4 |
| Heat build-up, ΔT, ° F.[9] | -------- | 53 | -------- | 36.5 | -------- | 58.1 | -------- | 57.5 | -------- | 59.1 | -------- | 54.4 |
| ν×10⁴, mols/cc.[10] | -------- | 2.76 | -------- | | -------- | 2.68 | -------- | 2.64 | -------- | 2.49 | -------- | 2.63 |

[1] High abrasion furnace black.
[2] Physical mixture containing 65% of a complex diarylamineketone reaction product and 35% of N, N'-diphenyl-p-phenylenediamine.
[3] Disproportionated rosin.
[4] Highly aromatic oil.
[5] N-cyclohexyl-2-benzothiazylsulfenamide.
[6] ASTM D623-52T. Scott Tensile Machine L-6. Tests are made at 80° F.
[7] ASTM D676-55T. Shore Durometer, Type A.
[8] ASTM D945-55 (modified). Yerzley oscillograph. Test specimen is a right circular cylinder 0.7 inch in diameter and 1 inch high.
[9] ASTM D623-52T. Method A, Goodrich Flexometer, 143 lbs./sq. in. load, 0.175 stroke. Test specimen is a right circular cylinder 0.7 inch in diameter and 1 inch high.
[10] Rubber World, 135, 67–73 and 254–260 (1956).

The polymer product of Run 1, which was prepared in the presence of a catalyst consisting of triethylgallium and molybdenum pentachloride, was examined by X-ray diffraction. The X-ray diffraction pattern showed that this polybutadiene was crystalline at room temperature. The X-ray diffraction pattern of the blend of polymers obtained in Runs 2–A, 2–B and 2–C showed that this polymer was amorphous rather than crystalline.

The data showed in Table VII demonstrate that the polymer products of this invention have outstanding physical properties, particularly as regards heat buildup, tensile strength, modulus, and aging characteristics. Furthermore, it is seen that the crystalline polybutadiene prepared with the triethylgallium-molybdenum pentachloride catalyst is even superior in certain respects to the polybutadiene produced with the organozinc-molybdenum pentachloride catalyst. The superiority of the crystalline polybutadiene is particularly pronounced in tensile strength and modulus of gum and black stocks in oven-aged black stocks.

EXAMPLE VIII

A run was carried out in which 1,3-butadiene was polymerized in the presence of a catalyst consisting of di-n-butylzinc and molybdenum pentachloride. The recipe employed in this run was as follows:

*Recipe*

| | |
|---|---|
| 1,3-butadiene _____ parts by weight__ | 100 |
| Toluene _____do____ | 1500 |
| Di-n-butylzinc _____do____ | [1] 0.745 |
| Molybdenum pentachloride _____do____ | [2] 1.12 |
| Temperature, °C. _____ | 50 |
| Time, hours _____ | 16 |
| Conversion, percent _____ | 52 |

[1] 4.17 mmols.  [2] 3.5 mmols.

The procedure followed in this run was essentially the same as that employed in the runs of Example I. Approximately 2 parts by weight per 100 parts of rubber it into isopropyl alcohol. Certain properties of the polymer were determined as shown below in Table VIII.

TABLE VIII

| | |
|---|---|
| Inherent viscosity | 9.2 |
| Gel, wt. percent | 0 |
| Mooney value (ML–4 at 212° F.) [1] | 59 |
| Microstructure, wt. percent [2]: | |
| Cis | 3±2 |
| Trans | 3.3 |
| Vinyl | 93±2 |

[1] See footnote 1 of Table VI.
[2] See footnote 1 of Table IV.

The high vinyl polybutadiene prepared in the foregoing run, an emulsion polybutadiene, a butadiene-styrene copolymer, and natural rubber (#1 smoked sheet) were compounded in accordance with the following recipe:

*Recipe*

| | Parts by Weight | |
|---|---|---|
| | Synthetic Polymers | #1 Smoked Sheet |
| Polymer | 100 | 100 |
| Philblack O [1] | 50 | 50 |
| Zinc oxide | 3 | 4 |
| Stearic acid | 2 | 3 |
| Flexamine | 1 | 1 |
| Philrich 5 [1] | 12.8 | 5 |
| Sulfur | 1.75 | 2 |
| Santocure [1] | ([2]) | 0.4 |

[1] See Footnotes to Table VII.
[2] Variable.

The emulsion polybutadiene was prepared at 41° F., using a rosin soap emulsifier. This polymer had a Mooney value (ML–4 at 212° F.) of 50. The butadiene-styrene copolymer was also prepared by emulsion polymerization at 41° F. using a rosin soap emulsifier. This copolymer had a Mooney value of 52 and a bound styrene content of 23.5 weight percent.

The polymers were compounded and then cured for 30 minutes at 307° F. Certain physical properties of the compounded polymers were determined as shown below in Table IX.

TABLE IX

|  | High Vinyl PBd | Emuls. PBd | Bd/St Copolymer | #1 Smoked Sheet |
|---|---|---|---|---|
| Santocure used, phr | 1.2 | 1.6 | 1.2 | 0.4 |
| 300% Modulus, p.s.i., 80° F.[1] | 1,550 | 1,175 | 1,220 | 1,600 |
| Tensile, p.s.i., 80° F.[1] | 2,380 | 2,180 | 3,500 | 2,900 |
| Elongation, percent, 80° F.[1] | 400 | 420 | 620 | 460 |
| ΔT, °F.: |  |  |  |  |
| Original [1] | 33.4 | 55.8 | 59.5 | 46.9 |
| Aged 24 hours at 212° F | 31.0 | 48.7 | 48.7 | 43.3 |
| Blowout data: |  |  |  |  |
| ΔT, °F, at 5 min | 49.1 | 85.7 | 110.8 | 99.2 |
| Maximum ΔT, °F | 66.8 | 184.6 | 296.8 | 148.5 |
| Time to blowout, Min | [2]120 | 10.6 | 9.5 | 6.5 |
| Air bomb aged 16 hours at 260° F. and 80 p.s.i. air: |  |  |  |  |
| 200% Modulus, p.s.i., 80° F.[1] | 1,680 |  | 1,480 |  |
| Tensile, p.s.i., 80° F.[1] | 2,230 | 910 | 2,110 | 120 |
| Elongation, percent, 80° F.[1] | 250 | 160 | 260 | 50 |
| Retention of tensile during air bomb aging, percent | 94 | 42 | 60 | 4 |
| Retention of elongation during air bomb aging, percent | 63 | 38 | 42 | 11 |

[1] See Footnotes to Table VII.
[2] Maximum run. No blowout after running 120 minutes.

The data shown in Table IX demonstrate that the high vinyl polybutadiene had a much lower heat buildup than the other polymers and a much higher retention of tensile strength and elongation after air bomb aging. The blowout resistance of the vinyl polybutadiene is also shown to be outstanding, being many times greater than that of the other polymers.

EXAMPLE IX

Two runs were carried out in which polybutadienes having a high vinyl content were prepared. In one of the runs, the high vinyl polymer was prepared with a catalyst of this invention while in the other run the polymer was prepared with a n-butyllithium catalyst. The recipes employed in these runs were as follows:

*Recipes*

|  | Run No. 1 | Run No. 2 |
|---|---|---|
| 1,3-butadiene, parts by weight | 100 | 100 |
| Toluene, parts by weight | 1,500 |  |
| Cyclohexane, parts by weight |  | 390 |
| Dimethoxyethane, parts by wt |  | 0.5 |
| Diethylzinc, mmols | 3 |  |
| Molybdenum pentachloride, mmols | 2.5 |  |
| n-Butyllithium, mmols |  | 1.75 |

The procedure followed in these runs was essentially the same as that described hereinabove in Example I. The operating conditions as well as certain properties of the products are shown below in Table X.

TABLE X

|  | 1 | 2 |
|---|---|---|
| Temperature, °C | 50 | 5 |
| Time, hours | 18 | 18 |
| Conversion, percent | 49 | 100 |
| ML-4 at 212° F.[1] | 62 | 49 |
| Inherent viscosity | 5.08 | 2.09 |
| Gel, wt. percent | 0 | 0 |
| Microstructure, percent: |  |  |
| Cis | [2]5 | [3]8.4 |
| Trans | 4 | 9.5 |
| Vinyl | 91 | 82.1 |

[1] See footnote 1 of Table VI.
[2] Scanned qualitatively and the value estimated by comparing sample with polymers analyzed previously.
[3] See footnote 2 of Table VI.

The two polybutadienes prepared as described above and an emulsion butadiene-styrene copolymer similar to that described in Example VIII were compounded in accordance with the following recipes:

*Recipes*

|  | Parts by Weight | |
|---|---|---|
|  | High Vinyl PBds | Emulsion Copolymer |
| Polymer | 100 | 100 |
| Philblack O [1] | 50 | 50 |
| Zinc oxide | 3 | 3 |
| Stearic acid | 2 | 2 |
| Flexamine [1] | 1 | 1 |
| Philrich 5 [1] | 15 | 10 |
| Sulfur | 1.75 | 1.75 |
| NOBS Special [2] | 1.2 |  |
| Santocure [1] |  | 1.2 |

[1] See Footnotes to Table VII.
[2] N-oxydiethylene-2-benzothiazyl sulfenamide.

The compounded stocks were cured for 30 minutes at 307° F. and certain physical properties were determined. The results of these determinations are shown below in Table XI.

TABLE XI

|  | 91% Vinyl PBd | 82.1% Vinyl PBd | Emulsion Copolymer |
|---|---|---|---|
| 300% Modulus, p.s.i., 80° F.[1] | 1,590 | 1,200 | 1,480 |
| Tensile, p.s.i., 80° F.[1] | 2,150 | 2,030 | 3,600 |
| Elongation, percent [1] | 380 | 415 | 600 |
| ΔT, °F.: |  |  |  |
| Original | 35.5 | 50.7 | 61.5 |
| Aged 24 hrs. at 212° F | 33.4 | 47.6 | 51.7 |
| Minutes to blowout | [2]60 | [2]60 | 7.8 |
| Air bomb aged 24 hours at 260° F. and 80 p.s.i. air: |  |  |  |
| 100% Modulus, p.s.i., 80° F.[1] | 530 | 570 | 620 |
| Tensile, p.s.i., 80° F.[1] | 1,920 | 1,520 | 2,080 |
| Elongation, percent [1] | 225 | 205 | 255 |
| Retention of tensile during air bomb aging, percent | 89 | 75 | 58 |
| Retention of elongation during air bomb aging, percent | 59 | 49 | 43 |

[1] See Footnotes to Table VII.
[2] Duration of test was 60 minutes. No blowout occurred.

The data in Table XI demonstrate the lower heat buildup, the superior blowout resistance, and the superior retention of tensile strength and elongation of the high vinyl polybutadienes prepared according to the present invention.

EXAMPLE X

A run was carried out in accordance with this invention in which 1,3-butadiene was polymerized in the presence of a lithium aluminum hydride-molybdenum pentachloride catalyst. Essentially the same procedure as described in Example I was followed in conducting this run. The recipe employed in this run was as follows:

Recipe

| | |
|---|---|
| 1,3-butadiene, parts by weight | 100 |
| Toluene, parts by weight | 440 |
| Lithium aluminum hydride, mmols | 25 |
| Molybdenum pentachloride, mmols | 20.8 |

In this run, the toluene was charged first after which the reactor was purged with nitrogen. The lithium aluminum hydride was then added as an approximately 0.5 molar solution in diethyl ether. The reactor was then purged with nitrogen to remove excess ether. After cooling the reactor in an ice bath, the molybdenum pentachloride was added followed by the butadiene.

The operating conditions employed in this run as well as certain properties of the product obtained are shown below in Table XII.

TABLE XII

| | |
|---|---|
| Temperature, °C. | 50 |
| Time, hours | 16 |
| Conversion, percent | 40 |
| Inherent viscosity | 4.3 |
| Gel, wt. percent | 9 |
| Microstructure, wt. percent [1]: | |
| Cis | 11.4 |
| Trans | 4.9 |
| Vinyl | 84 |

[1] Determined by method of Silas, Yates and Thornton.

The polymer was compounded in accordance with the following recipes:

Recipes

| | Parts by Weight | |
|---|---|---|
| | Gum | Tread |
| Rubber | 100 | 100 |
| Philblack O [1] | 0 | 50 |
| Zinc oxide | 3 | 3 |
| Stearic acid | 2 | 2 |
| Resin 731 [1] | 3 | 3 |
| Flexamine [1] | 1 | 1 |
| Sulfur | 1.75 | 1.75 |
| Santocure [1] | 1 | 1 |

[1] See footnotes to Table VI.

The compounded stocks were cured for 30 minutes at 307° F., and certain physical properties were then determined. The results of these determinations are shown below in Table XIII.

TABLE XIII

| | Gum | Tread |
|---|---|---|
| 300% Modulus, p.s.i. [1] | 300 | 2,690 |
| Tensile strength, p.s.i. [1] | 580 | 2,740 |
| Elongation, percent [1] | 460 | 305 |
| ΔT, °F. (cured 40 minutes) [1] | 18 | 45 |

| OVEN AGED 24 HOURS AT 212° F. | | |
|---|---|---|
| Tensile strength, p.s.i. [1] | 450 | 2,390 |
| ΔT, °F. [1] | 15 | 41 |

[1] See footnotes to Table VII.

The data shown in Table XIII show that the highly vinyl polybutadiene prepared with a lithium aluminum hydride-molybdenum pentachloride catalyst has physical properties which are excellent, particularly as regards heat buildup, tensile strength and modulus.

EXAMPLE XI

A run was conducted in which 1,3-butadiene was polymerized with a catalyst consisting of a solution of lithium aluminum hydride in an amine and molybdenum pentachloride. The following recipe was used in this run, which was conducted in essentially the same manner as the runs of Example I.

Recipe

| | |
|---|---|
| 1,3-butadiene, parts by weight | 100 |
| Cyclohexane, parts by weight | 780 |
| $LiAlH_4$, millimols | 10 |
| $MoCl_5$, millimols | 8.3 |
| Temperature, °C. | 50 |
| Time, hours | 17 |
| Conversion, percent | 7 |

In this run, the cyclohexane was charged first to the reactor. The lithium aluminum hydride was then added as an 0.22 molar solution in triethylamine. Thereafter, the molybdenum pentachloride and butadiene were then introduced into the reactor in that order.

The polybutadiene product obtained in this run had the appearance of a high vinyl polymer.

Having thus described the invention by providing specific examples thereof it is to be understood that no undue limitations or restrictions are to be drawn by reason thereof and that many variations and modifications are within the scope of the invention.

I claim:

1. A process for preparing a rubbery high vinyl polybutadiene which comprises contacting 1,3-butadiene under polymerization conditions with a catalyst formed by mixing (1) molybdenum pentachloride and (2) a compound selected from the group consisting of (a) compounds having the formula $R_nM$, wherein R is selected from the group consisting of alkyl, aryl, cycloalkyl, aralkyl and alkaryl radicals containing 1 to 10 carbon atoms, M is a metal selected from the group consisting of gallium, lead, zinc, mercury and indium, and $n$ is equal to the valence of the metal M, and (b) compounds having the formula $M'M''H_4$, wherein M' is an alkali metal, and M'' is selected from the group consisting of aluminum and boron, said $M'M''H_4$ compound being in solution in a compound selected from the group consisting of ethers and amines, said contacting occurring in a diluent selected from the group consisting of an aromatic hydrocarbon and a cycloaliphatic hydrocarbon, a promoter selected from the group consisting of ethers, amines and amides having been added to said cycloaliphatic hydrocarbon.

2. A process for preparing a rubbery high vinyl polybutadiene which comprises contacting 1,3-butadiene under polymerization conditions with a catalyst formed by mixing (1) molybdenum pentachloride and (2) a compound having the formula $R_nM$, wherein R is selected from the group consisting of alkyl, aryl, cycloalkyl, aralkyl and alkaryl radicals containing 1 to 10 carbon atoms, M is a metal selected from the group consisting of lead, zinc, mercury and indium, and $n$ is equal to the valence of the metal M, said contacting occurring in a diluent selected from the group consisting of an aromatic hydrocarbon and a cycloaliphatic hydrocarbon, a promoter selected from the group consisting of ethers, amines and amides having been added to said cycloaliphatic hydrocarbon.

3. The process according to claim 2 in which said catalyst is formed by mixing molybdenum pentachloride and di-n-butylzinc.

4. The process according to claim 2 in which said catalyst is formed by mixing molybdenum pentachloride and diethylzinc.

5. The process according to claim 2 in which said catalyst is formed by mixing molybdenum pentachloride and tetraethyllead.

6. The process according to claim 2 in which said catalyst is formed by mixing molybdenum pentachloride and triisobutylindium.

7. The process according to claim 2 in which said catalyst is formed by mixing molybdenum pentachloride ond di-n-butylmercury.

8. A process for preparing a rubbery high vinyl polybutadiene which comprises contacting 1,3-butadiene at a temperature in the range of 0 to 150° C. and under autogenous pressure with a catalyst formed by mixing (1) molybdenum pentachloride and (2) a compound having the formula $R_nM$, wherein R is selected from the group consisting of alkyl, aryl, cycloalkyl, aralkyl, and alkaryl radicals having 1 to 10 carbon atoms, M is a metal selected from the group consisting of lead, zinc, mercury and indium, and $n$ is equal to the valence of the metal M, said contacting occurring in a diluent selected from the group consisting of an aromatic hydrocarbon and a cycloaliphatic hydrocarbon, a promoter selected from the group consisting of ethers, amines and amides having been added to said cycloaliphatic hydrocarbon, the amount of said $R_nM$ compound used to form said catalyst being in the range of 0.8 to 5.0 mols per mol of molybdenum pentachloride; and recovering a polybutadiene product containing at least 65 percent 1,2-addition.

9. The process according to claim 8 in which said diluent is an aromatic hydrocarbon.

10. The process according to claim 9 in which said aromatic hydrocarbon diluent is benzene.

11. The process according to claim 9 in which said aromatic hydrocarbon diluent is toluene.

12. A process for preparing a high vinyl rubbery polybutadiene which comprises contacting 1,3-butadiene under polymerization conditions with a catalyst formed by mixing (1) molybdenum pentachloride and (2) a compound having the formula $R_3Ga$, wherein R is selected from the group consisting of alkyl, aryl, cycloalkyl, aralkyl and alkaryl radicals containing 1 to 10 carbon atoms, said contacting occurring in a diluent selected from the group consisting of an aromatic hydrocarbon and a cycloaliphatic hydrocarbon, a promoter selected from the group consisting of ethers, amines and amides having been added to said cycloaliphatic hydrocarbon.

13. The process according to claim 12 in which said catalyst is formed by mixing molybdenum pentachloride and triethylgallium.

14. A process for preparing a high vinyl rubbery polybutadiene which comprises contacting 1,3-butadiene under polymerization conditions with a catalyst formed by mixing (1) molybdenum pentachloride and (2) a compound having the formula $M'M''H_4$, wherein M' is an alkali metal, and M" is selected from the group consisting of aluminum and boron, said $M'M''H_4$ being in solution in a solvent compound selected from the group consisting of ethers and amines and said contacting occurring in a diluent selected from the group consisting of an aromatic hydrocarbon and a cycloaliphatic hydrocarbon, a promoter selected from the group consisting of ethers, amines and amides having been added to said cycloaliphatic hydrocarbon.

15. The process according to claim 14 in which said catalyst is formed by mixing molybdenum pentachloride and an ether solution of lithium aluminum hydride.

16. A process for polymerizing 1,3-butadiene which comprises contacting butadiene with a catalyst formed by mixing molybdenum pentachloride and 1.0 to 2.0 mols of triethylgallium per mol of molybdenum pentachloride, said contacting occurring in an aromatic hydrocarbon at a temperature in the range of 10 to 80° C. and under autogenous pressure.

17. A process for polymerizing 1,3-butadiene which comprises contacting butadiene with a catalyst formed by mixing molybdenum pentachloride and 1.0 to 2.0 mols of diethylzinc per mol of molybdenum pentachloride, said contacting occurring in an aromatic hydrocarbon at a temperature in the range of 10 to 80° C. and under autogenous pressure.

References Cited by the Examiner

UNITED STATES PATENTS

| | | | |
|---|---|---|---|
| 2,900,372 | 8/1959 | Gresham | 260—94.3 |
| 2,962,488 | 11/1960 | Horne | 260—94.3 |
| 3,038,863 | 6/1962 | Balthis et al. | 260—94.3 |
| 3,139,418 | 6/1964 | Marullo et al. | 260—94.3 |

FOREIGN PATENTS

| | | |
|---|---|---|
| 215,043 | 11/1956 | Australia. |
| 549,554 | 1/1957 | Belgium. |

(Equivalent to 221,121, Australia.)

| | | |
|---|---|---|
| 551,851 | 4/1957 | Belgium. |
| 554,242 | 5/1957 | Belgium. |
| 574,129 | 6/1959 | Belgium. |

(Corresponds to 1,223,391, France.)

| | | |
|---|---|---|
| 585,827 | 6/1960 | Belgium. |
| 776,326 | 6/1957 | Great Britain. |
| 1,221,244 | 1/1960 | France. |

JOSEPH L. SCHOFER, *Primary Examiner.*

L. H. GASTON, *Examiner.*